(12) United States Patent
Beard

(10) Patent No.: X4973
(45) Date of Patent: Jan. 25, 1828

(54) WATER WHEEL, SCREW

(76) Inventor: Ebenezer Beard

United States Patent

Patent No.: X4973

Ebenezer Beard
Letters Patent

The Schedule referred to in these Letters Patent and making part of the same containing a description in the words of the said Ebenezer Beard himself of his improvement in the screw Water Wheel

---

To all persons to whom these presents shall come Ebenezer Beard of Charles-town in the County of Middlesex commonwealth of Massachusetts gentleman sends greeting. Be it known that I the said Ebenezer Beard have discovered, invented, constructed & made & applied to use a new & useful improvement in propelling vessels of all descriptions called the screw water wheel to be applied to vessels of all descriptions either by hand horse power or steam & to be placed either at the sides & stern of any vessel or at the sides only or at the stern only. The said Screw water wheel may contain either two or four paddles placed a quarter slant to each other which said screw water wheel whether embracing two or four paddles is to be placed under the surface of the water. In testimony that the above is a true specification of my said improvement or discovery as above described I have hereto set my hand & seal the fifteenth day of December in the year of our Lord 1827

Ebenezer Beard [illegible] Seal

Witnesses
Wm Austin
Nathan Austin (234 words)

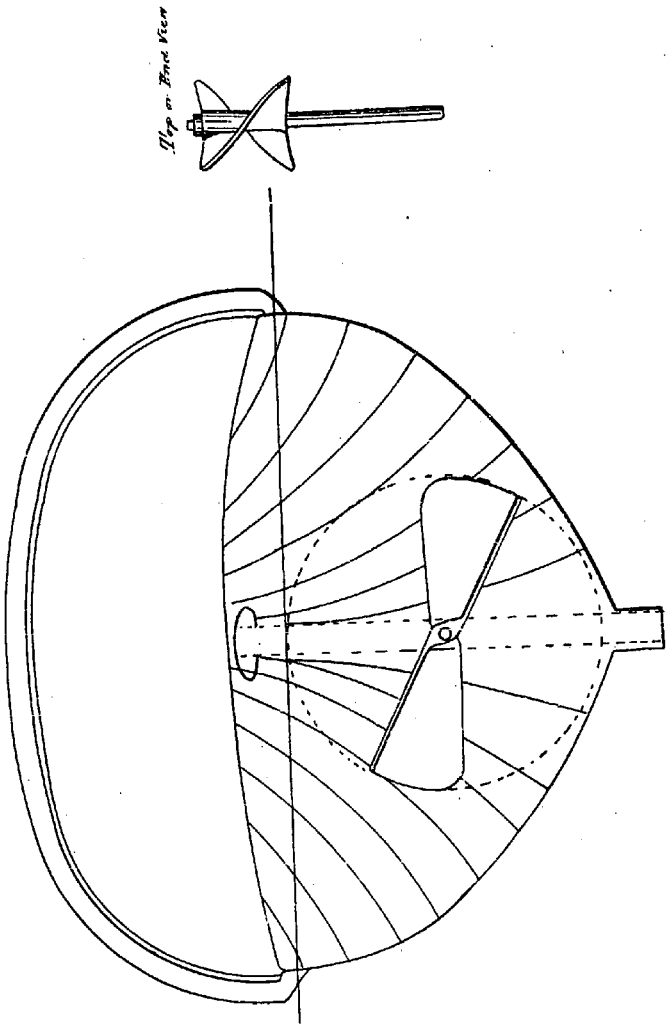

United States Patent
Patent No.: X4973
E. Beard,
Screw Propeller.
(Water-wheel, Screw.)
Patented Jan. 25, 1828.